(12) United States Patent
Fäcke et al.

(10) Patent No.: US 10,254,465 B2
(45) Date of Patent: Apr. 9, 2019

(54) ILLUMINATION DEVICE FOR A LIQUID CRYSTAL DISPLAY

(71) Applicant: Covestro Deutschland AG, Leverkusen (DE)

(72) Inventors: Thomas Fäcke, Leverkusen (DE); Friedrich-Karl Bruder, Krefeld (DE); Rainer Hagen, Leverkusen (DE); Günther Walze, Leverkusen (DE); Thomas Roelle, Leverkusen (DE); Horst Berneth, Leverkusen (DE); Dennis Hönel, Zülpich-Wichterich (DE); Marc-Stephan Weiser, Leverkusen (DE); Werner Hoheisel, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 722 days.

(21) Appl. No.: 14/419,772

(22) PCT Filed: Aug. 9, 2013

(86) PCT No.: PCT/EP2013/066686
§ 371 (c)(1),
(2) Date: Feb. 5, 2015

(87) PCT Pub. No.: WO2014/026917
PCT Pub. Date: Feb. 20, 2014

(65) Prior Publication Data
US 2015/0177443 A1 Jun. 25, 2015

(30) Foreign Application Priority Data
Aug. 13, 2012 (EP) .................................. 12180244

(51) Int. Cl.
*F21V 8/00* (2006.01)
*G02F 1/1335* (2006.01)
(Continued)

(52) U.S. Cl.
CPC ........... *G02B 6/0051* (2013.01); *G02B 6/005* (2013.01); *G02B 6/0035* (2013.01);
(Continued)

(58) Field of Classification Search
CPC ..................................... G02B 6/0051
See application file for complete search history.

(56) References Cited

U.S. PATENT DOCUMENTS 5,854,697 A 12/1998 Caulfield et al.
5,930,011 A * 7/1999 Gambogi, Jr. ......... G02B 5/203
349/105
(Continued)

OTHER PUBLICATIONS

International Search Report from corresponding PCT/EP2013/066686, dated Oct. 9, 2013.

*Primary Examiner* — Sang V Nguyen
(74) *Attorney, Agent, or Firm* — Drinker Biddle & Reath LLP

(57) ABSTRACT

The invention relates to an illumination device for illuminating at least one light modulator system of a liquid crystal display, the device comprising at least one waveguide substrate for guiding at least one targeted light beam that can be coupled into the waveguide substrate. The waveguide substrate is at least in optical contact with at least one holographic optical decoupling substrate comprising a plurality of decoupling regions and a decoupling region is at least designed to decouple part of the targeted light beam in the form of a plurality of sub-beams in the direction of the light modulator system. At least one diffuser module is provided, said diffuser module being designed in such a way that at
(Continued)

Figure 1:
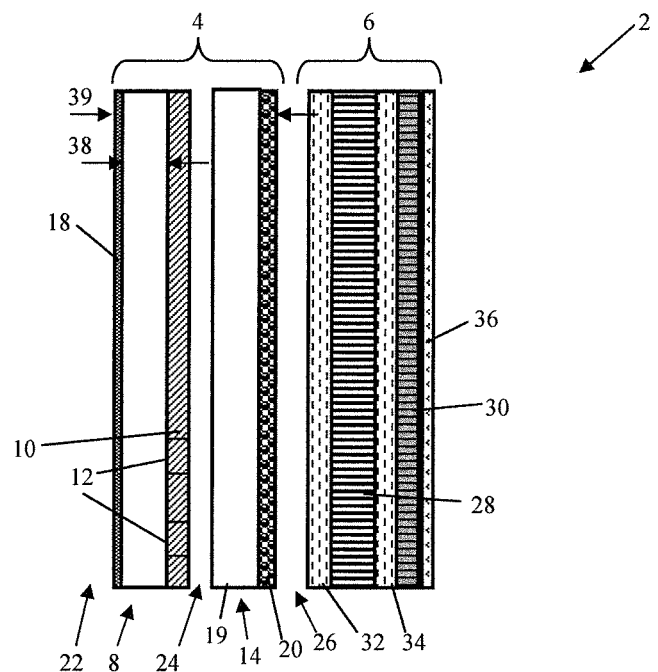

least the outermost sub-beams of two neighboring decoupling regions are at least adjacent to one another before exiting the diffuser module.

15 Claims, 10 Drawing Sheets

(51) Int. Cl.
  *G03H 1/30* (2006.01)
  *G03H 1/22* (2006.01)
(52) U.S. Cl.
  CPC ...... *G02F 1/133617* (2013.01); *G02B 6/0028* (2013.01); *G02B 6/0061* (2013.01); *G03H 1/30* (2013.01); *G03H 2001/2226* (2013.01); *G03H 2001/2231* (2013.01); *G03H 2001/2234* (2013.01); *G03H 2240/55* (2013.01)

(56) References Cited

U.S. PATENT DOCUMENTS

| | | | |
|---|---|---|---|
| 2006/0187377 A1 | 8/2006 | You et al. | |
| 2006/0279296 A1 | 12/2006 | Lee et al. | |
| 2007/0081359 A1* | 4/2007 | Kim | G02B 5/0226 362/608 |
| 2007/0211342 A1* | 9/2007 | Komatsu | G02B 5/1871 359/566 |
| 2010/0079704 A1* | 4/2010 | Cho | G02F 1/133617 349/71 |
| 2012/0147443 A1* | 6/2012 | Joo | G02B 5/32 359/15 |
| 2012/0268967 A1* | 10/2012 | Wang | G02B 6/0053 362/627 |
| 2012/0294037 A1* | 11/2012 | Holman | F21V 5/02 362/609 |

* cited by examiner

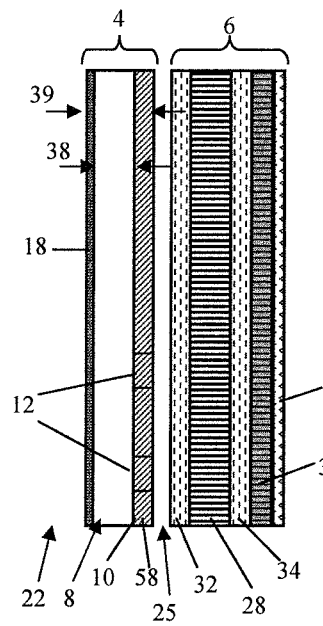
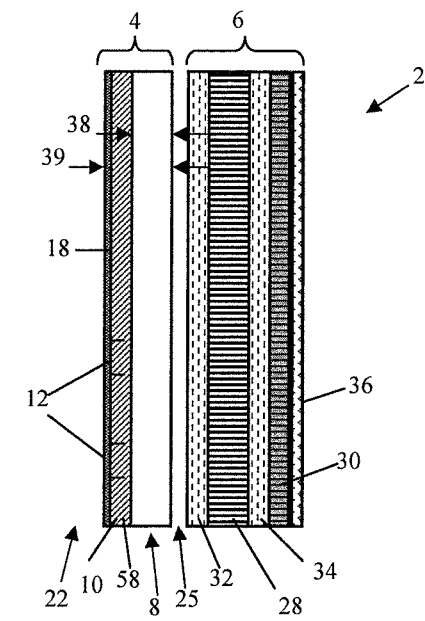
Fig. 8a        Fig. 8b
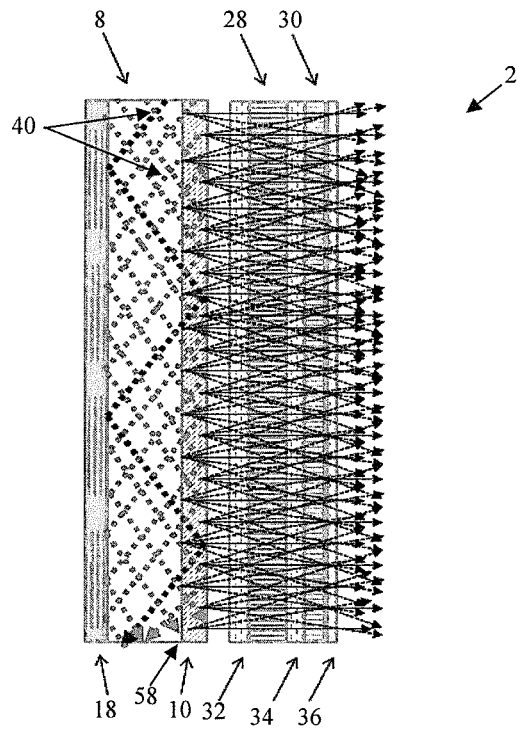
Fig. 9

ILLUMINATION DEVICE FOR A LIQUID CRYSTAL DISPLAY

CROSS REFERENCE TO RELATED APPLICATIONS

This application is a § 371 National Stage Application of PCT/EP2013/066686, filed Aug. 9, 2013, which claims priority to EP 12180244.1, filed Aug. 13, 2012.

BACKGROUND

Field of the Invention

The invention relates to an illumination apparatus for illuminating at least one light modulator device of a liquid-crystal display, comprising at least one light guide substrate for guiding at least one directional light beam which can be coupled into the light guide substrate, the light guide substrate being at least in optical contact with at least one holographic-optical output coupling substrate comprising a multiplicity of output coupling regions, an output coupling region being at least adapted in order to couple out a part of the directional light beam in the form of a multiplicity of subbeams in the direction of the light modulator device. The invention furthermore relates to an illumination system and to a liquid-crystal display.

Description of Related Art

Currently, liquid-crystal displays, also referred to as LC displays, are widely used. Such displays are found with various forms in a multiplicity of applications, such as mobile devices, for example mobile telephones, game computers, laptops, tablet PCs or desktop monitors, televisions, advertising panels and building installations.

Liquid-crystal displays comprise at least one electrically drivable layer comprising liquid crystals, which changes the polarization of the light as a function of the applied electrical voltage. This layer is also referred to as a light modulator. The light modulator is, in particular, a light-transmissive digital spatial light modulator. Together with further layers, such as polarizer layers, the light modulator can form a light modulator device.

A liquid-crystal display furthermore comprises a rear illumination apparatus, also referred to as a backlight unit (BLU), which is provided for generating light and directing the light towards the light modulator device. In the prior art, cold cathode fluorescent lamps and light-emitting diodes (LEDs) are used for generating light in the illumination apparatus. The emission characteristic of these light sources is such that they emit nondirectional light. In this case, besides direct lighting, the possibility of shining or coupling in nondirectional light on an edge of the illumination apparatus is also known from the prior art.

Direct lighting has the advantage that the light can be distributed very homogeneously over the entire size of the light modulator device by suitable spatial positioning of the individual light sources, which in particular is a quality criterion for all types of LC displays. The use of LEDs in direct lighting furthermore offers the advantage that they can be dimmed and thus lead to an increased contrast value of the display. Disadvantages of direct lighting are the high costs and the energy consumption, since it is necessary to have a multiplicity of light sources.

In the alternative illumination technique, light sources are mounted on the edges of a light guide substrate and shine the light into the light guide substrate. From this lateral position, the light is guided towards the middle of the display by total reflection. By light output elements fitted on the rear surface side of the light guide substrate, the light is directed forwards in the direction of the light modulator device. Typical light output elements are in this case printed patterns of white ink, roughened surfaces or embossed light-refracting structures. The number of the density of these structures can be selected freely and allows very homogeneous lighting of the display. Corresponding formed displays, however, have only reduced representation qualities.

Besides the constant requirement to produce liquid-crystal displays with a smaller layer thickness and a lower energy consumption, however, an essential aim is to provide liquid-crystal displays having improved representation qualities. Measurement quantities which provide information about the representation quality are, inter alia, the size of the colour space (gamut), the homogeneity of the lighting (light density distribution), the contrast ratio and a colour-neutral representation, i.e. one which is spectrally invariant irrespective of the switching state of the LC cell.

From the prior art, it is known to use special LC cells, such as double super twisted nematic (DSTN) or film-supertwisted (FST) cells, in the light modulator in order to obtain a colour-accurate representation.

Furthermore, the colour fidelity of the individual pixel can be improved when the spectral bandwidth of the light source is reduced, since the colour mixing is thereby carried out more precisely.

The energy efficiency and the colour fidelity of LC displays can be increased, in particular, by using spectrally narrowband-emitting light generation devices. The light generation device is, in particular, adapted in order to generate a directional light beam. A directional light beam consists of electromagnetic radiation whose energy flux takes place in one direction and whose divergence is less than 0.052 rad, preferably less than 0.026 rad, particularly preferably less than 0.017 rad. For example, it is known from the prior art to use a laser device, such as a laser diode, as a generation device for a directional light beam.

For instance, U.S. Pat. No. 5,854,697 A discloses an illumination apparatus which comprises a light guide substrate for guiding a directional light beam. The directional light beam is shone in on one edge of the light guide substrate with a particular input angle, and propagates in the light guide substrate. The light guide substrate is furthermore in optical contact with a holographic-optical output coupling substrate comprising a multiplicity of output coupling regions. An output coupling region is intended, in particular, to mean the region in the holographic-optical output coupling substrate in which the directional light beam enters the holographic-optical output coupling substrate and is partially coupled out.

The holographic-optical output coupling substrate may in this case have varying diffraction efficiencies along the light guide substrate, in order to permit a uniform output intensity along the waveguide. As the recording material for the holographic-optical output coupling substrate, a photographic emulsion is used in U.S. Pat. No. 5,854,697 A.

Although, by this prior art, the layer thickness of the illumination apparatus can be reduced and the energy consumption can simultaneously be reduced, a problem with this prior art is that the light coupled out is directional and emitted in a direction parallel to the surface normal of the light guide substrate. This entails the problem that the illumination apparatus has different brightnesses for an observer's eyes. Consequently, a light modulator device, in particular the individual pixels of a light modulator, is/are lit with different light intensities. This leads to a liquid-crystal display having reduced representation qualities.

SUMMARY

It is therefore an object of the invention to provide an illumination apparatus for illuminating at least one light modulator device of a liquid-crystal display, which has a small layer thickness and a low energy consumption, and at the same time ensures an improved representation quality of the liquid-crystal display.

The object is achieved according to the invention with an illumination apparatus as claimed in present patent claim 1. The illumination apparatus for illuminating at least one light modulator device of a liquid-crystal display comprises at least one light guide substrate for guiding at least one directional light beam which can be coupled into the light guide substrate. The light guide substrate is at least in optical contact with at least one holographic-optical output coupling substrate comprising a multiplicity of output coupling regions. An output coupling region is at least adapted in order to couple out a part of the directional light beam in the form of a multiplicity of subbeams in the direction of the light modulator device. The illumination apparatus comprises at least one diffuser module. The diffuser module is adapted in such a way that at least the outermost subbeams of two neighbouring output coupling regions at least adjoin one another before exit from the diffuser module.

The effect achieved by providing at least one diffuser module according to the invention for diffuse widening of the light beams coupled out, in contrast to the prior art, is that the light beams coupled out reach a pixel-based spatial light modulator with a homogeneous intensity and with a homogeneous angular distribution. Visually perceptible inhomogeneity in the lateral light distribution is avoided in the liquid-crystal display. In particular, an improved representation quality is achieved by the diffuser module being adapted in such a way that the outermost light beams coupled out of two (directly) neighbouring output coupling regions at least adjoin one another, and these light beams may preferably overlap.

DETAILED DESCRIPTION OF A PREFERRED EMBODIMENT

The illumination apparatus comprises a light guide substrate. The light guide substrate, also referred to as a waveguide, is adapted in order to guide at least one directional light beam, preferably a laser beam. The directional light beam can be coupled or shone in on one edge of the light guide substrate. In particular, the light beam is shone in with a predeterminable input angle. The directional light beam can propagate through the light guide substrate by total reflection at the interfaces of the light guide substrate, or of the holographic-optical output coupling substrate which is in optical contact with the light guide substrate. It is to be understood that a multiplicity of directional light beams may be coupled in on an edge, as will be explained below.

Furthermore, a holographic-optical output coupling substrate is provided, which is in direct optical contact with the light guide substrate. For example, the light guide substrate may comprise the holographic-optical output coupling substrate. The optical contact between the elements may, for example, be achieved by direct lamination of the holographic-optical output coupling substrate on the light guide substrate. As an alternative, the optical contact may for example be established by means of a liquid. The liquid used may have a refractive index which corresponds to the refractive index of the holographic-optical output coupling substrate and/or of the light guide substrate. If the refractive index of the holographic-optical output coupling substrate differs from the refractive index of the light guide substrate, the refractive index of the liquid may lie between these values. Advantageously, such liquids have a sufficiently low volatility to be used for permanent bonding. In another preferred alternative, the optical contact may be established by an optically transparent adhesive, which may be applied as a liquid. As an alternative, a transfer adhesive film may be used. The refractive index of an adhesive which is used may be selected in accordance with the refractive index of the liquid described above.

The holographic-optical output coupling substrate may be formed from a recording material for volume holograms. The holographic-optical output coupling substrate comprises a multiplicity of output coupling regions, an output coupling region being at least adapted in order to direct a part of the directional light beam in the form of a multiplicity of subbeams towards the light modulator device. An output coupling region is, in particular, the region in a holographic-optical output coupling substrate in which the directional light beam is partially coupled out, or diffracted away. This region depends, inter alia, on the design of the holographic-optical output coupling substrate and the beam width of the directional light beam coupled in.

According to the invention, it has been discovered that a light modulator device can be illuminated sufficiently homogeneously when a diffuser module is provided and is adapted in such a way that at least the outermost subbeams of two neighbouring output coupling regions at least adjoin one another before exit from the diffuser module. Two neighbouring output coupling regions are intended in particular to mean the directly neighbouring output coupling regions, between which no other output coupling region is arranged. In a special case, the output coupling regions may adjoin one another directly. The outermost subbeams at least adjoining one another, preferably overlapping, before they leave the diffuser module ensures that the diffuser module is formed as a flat light source with a homogeneous light intensity. Preferably, the outermost subbeams of an output coupling region at least adjoin to one another the outermost subbeams of all output coupling regions directly neighbouring this output coupling region before exit from the diffuser module, so that the diffuser module has no regions of low light intensity. In particular, it is perceived as a single light source.

It is possible to provide an illumination apparatus for spatial light modulators with electronic pixel driving which has a high colour fidelity by the use of directional light beams, for example from laser diodes as light sources, and which projects light efficiently and homogeneously onto the transparent light modulator. Furthermore, the illumination apparatus according to the invention has a simple, flat and compact design. In addition, the number of light sources can be minimized in the illumination apparatus according to the invention.

According to a first embodiment of the illumination apparatus according to the invention, the diffuser module may be a separate diffuser substrate arranged between the light guide substrate and the light modulator to be illuminated. The diffuser substrate may be a volume scatterer. In a preferred embodiment of the illumination apparatus, the separate diffuser substrate may comprise at least one transparent layer and one diffusely scattering layer. The diffusely scattering layer may, for example, comprise organic or inorganic scattering particles, which may be embedded in a carrier layer. The scattering particles and the carrier layer, for example the transparent layer, have different refractive indices. In a particularly preferred embodiment, the scattering particles are optically nonabsorbent and quasi-spherical. By virtue of a separate diffuser substrate, a desired diffuser effect can be achieved in a straightforward way.

As an alternative or in addition to a separate diffuser substrate, the diffuser module may be integrated in the holographic-optical output coupling substrate. The optical function of the diffuse beam widening may be implemented in the holographic-optical element 2 itself. For example, the output coupling regions may have a diffuser function and may be arranged with respect to one another in such a way that it is possible to ensure that at least the outermost subbeams of two neighbouring output coupling regions at least adjoin one another before exit from the diffuser module, i.e. the holographic-optical output coupling substrate. The advantage of a corresponding structure consists, in particular, in a further reduction of the layer thickness of the illumination apparatus. The use of a separate diffuser substrate can be obviated.

It is to be understood that the separate diffuser substrate may be combined with the diffuser module integrated in the holographic-optical output coupling substrate.

According to another embodiment of the illumination apparatus according to the invention, an interlayer may be arranged between the separate diffuser substrate and the light guide substrate. The refractive index of the interlayer may be at least less than the refractive index of the light guide substrate. By arranging an interlayer (directly) on the light guide substrate, total reflection of the at least one directional light beam in the light guide substrate is achieved in a straightforward way. If the holographic-optical output coupling substrate is arranged on the light guide substrate, in an alternative embodiment an interlayer may be arranged between the separate diffuser substrate and the holographic-optical output coupling substrate, the refractive index of the interlayer being at least less than the refractive index of the holographic-optical output coupling substrate.

The interlayer may in principle be formed in any desired way, so long as the refractive index of the interlayer is at least less than the refractive index of the light guide substrate, or of the holographic-optical output coupling substrate. For example, the interlayer may be a gas layer. The gas layer may be configured in the form of an air gap between the light guide substrate or the holographic-optical output coupling substrate and the diffuser substrate. As an alternative or in addition to a gas layer, a (low refractive index) adhesive layer, a (low refractive index) contact liquid, a (low refractive index) surface modification of the diffuser substrate and/or a (low refractive index) surface modification of the holographic-optical output coupling substrate may be provided.

Furthermore, in another embodiment of the illumination apparatus, the holographic-optical output coupling substrate may have an angle-widening function. The angle-widening property of the holographic-optical output coupling substrate may be produced by various measures. For example, the angular divergence of a directional light beam coupled in and the angular acceptance of the holographic-optical output coupling substrate may be adapted to one another when writing the holographic-optical output coupling substrate, in such a way that the angular divergence of the directional light beam that can be coupled in is imaged as the angular divergence of the beam diffracted away. As an alternative or in addition, the holographic-optical output coupling substrate may have its own diffuser property. For example, this diffuser property may be produced through holographic exposure by means of a signal beam generated by a diffuser. Furthermore, as an alternative or in addition, the holographic-optical output coupling substrate may be formed from a multiplexed structure, the structure being formed from a plane-wave object beam and plane-wave reference beam. The holographic-optical output coupling substrate may, as an alternative or in addition, be formed from a selectively multiplexed structure consisting of a spherical-wave object beam and plane-wave reference beam. Furthermore, the holographic-optical output coupling substrate may, as an alternative or in addition, be formed from a selectively multiplexed structure consisting of a spherical-wave object beam and spherical-wave reference beam.

For a particularly high colour fidelity, according to another embodiment of the illumination apparatus according to the invention, the holographic-optical output coupling substrate may comprise a multiplicity of individual hologram modules. An individual hologram module, also referred to as an individual hologram, may be adapted in order to diffract a particular primary colour. In particular, an individual hologram module is adapted in order to diffract precisely one particular primary colour. The individual holograms may respectively be formed especially in such a way that they only diffract radiation of one of the three primary colours red, green and blue. It is to be understood that more than three primary colours may also be used. For example, four primary colours (for example "red", "green", "blue" and "yellow") may be used. Advantageously, it is possible to holographically represent special colour arrangements with interleaved colour points, for example the RGBG layout with alternating red and blue pixels. In this way, the colour sensitivity of the human eye can be accommodated.

The holographic-optical output coupling substrate may preferably comprise a recording material for volume holograms. According to one embodiment, the holographic-optical output coupling substrate may be formed from holographic silver halide emulsions, dichromatic gelatins, photorefractive materials, photochromic materials or photopolymers, preferably from photopolymers containing a photoinitiator system and polymerizable writing monomers, particularly preferably photopolymers containing a photoinitiator system, polymerizable writing monomers and crosslinked matrix polymers, more particularly preferably from photopolymers containing a photoinitiator system, a polymerizable writing monomer, a crosslinked matrix and a urethane, which is substituted with at least one fluorine atom.

Suitable recording materials are, for example, silver halide emulsions, dichromatic gelatins, photorefractive materials, photochromic materials or photopolymers. Silver halide emulsions and photopolymers are essentially preferred. Very bright and contrast-rich holograms can be written in silver halide emulsions, although increased outlay is necessary for protection of the moisture-sensitive films in order to ensure sufficient longterm stability. For photopolymers, there are a plurality of basic material concepts, a common feature of all photopolymers being the photoinitiator system and polymerizable writing monomers. Furthermore, these constituents may be embedded in carrier materials, for example thermoplastic binders, crosslinked or uncrosslinked binders, liquid crystals, sol-gels or nanoporous glasses. In addition, further properties may be deliberately adjusted in a controlled way by special additives. In a particular embodiment, a photopolymer may also contain plasticizers, stabilizers and/or other additives. This is advantageous particularly in connection with crosslinked matrix polymers containing photopolymers, such as are described for example in EP2172505A1. The photopolymers described therein have a photoinitiator system modularly adjustable to the necessary wavelength as photoinitiator, writing monomers having actinically polymerizable groups and a highly crosslinked matrix polymer. If suitable additives are added, selected as described in WO 2011/054796, it is possible to produce particularly advantageous materials which offer an industrially beneficial material in terms of their optical properties, producibility and processability. Suitable additives according to this method are in particular urethanes, which are preferably substituted with at least one fluorine atom. These materials can be adjusted over wide ranges in terms of their mechanical properties, and can therefore be adapted both in the unilluminated and in the illuminated state to many requirements (WO 2011054749 A1). The photopolymers described can be produced either by roll-to-roll methods (WO 2010091795) or by printing methods (EP 2218742).

According to another embodiment, the layer thickness of the light guide substrate may lie between 30 μm and 10 mm, preferably between 100 μm and 2 mm, and particularly preferably between 300 μm and 1 mm. Besides reducing the overall layer thickness of the illumination apparatus, with a reduced layer thickness of the light guide substrate, in particular of less than 1 mm, it is advantageous that the number of passes of a directional light beam coupled in through the holographic-optical output coupling substrate can be increased. At the same time, these lie closer to one another. In other words, the distance between two directly neighbouring output coupling regions can be reduced. An improved overlap of the light beams diffracted away in the diffuser module can thereby be achieved.

In order to improve even further the homogeneity of the light striking the light modulator device, according to a preferred embodiment of the illumination apparatus according to the invention, it is proposed that the layer thickness of the light guide substrate may be formed in such a way that the layer thickness of the light guide substrate essentially corresponds to the beam width of a directional light beam coupled into the light guide substrate.

An improved homogeneity can also be achieved when, according to another embodiment, the holographic-optical output coupling substrate has an angular divergence of between 1° and 120°, preferably between 5° and 60°, and particularly preferably between 10° and 45°. The angular divergence is defined here as the widening angle between the outer beam components, in which 50% of the maximum light intensity is measured radially.

According to another embodiment of the illumination apparatus, the holographic-optical output coupling substrate may be a reflection or transmission volume hologram, preferably a reflection or transmission volume hologram recorded using the edge-lit geometry.

The object is achieved according to another aspect of the invention with an illumination system as claimed in patent claim 12. The illumination system comprises at least one illumination apparatus as described above and at least one light generation device for coupling at least one directional light beam into the light guide substrate. The at least one light generation device may, for example, be a laser beam generation device, such as a laser diode. The light generation device may, in particular, be arranged on an edge of the light guide substrate, in order to shine the light beam into the light guide substrate on this edge.

The illumination system according to the invention generates, in particular, two-dimensionally homogeneous light in a compact illumination apparatus with efficient use of the directional light shone in, such as laser light, with a small number of individual light generation devices, in that the holographic-optical output coupling substrate, particularly in combination with the at least one diffuser module, distributes the at least one directional light beam shone in into a multiplicity of subbeams, which are diffracted in the direction of the light modulator, in equal intensities, and orientates these subbeams in such a way that the subbeams reach a pixel-based spatial light modulator with a homogeneous intensity and with a homogeneous angular distribution, and no visually perceptible inhomogeneity in the lateral light distribution occurs in the liquid-crystal display.

According to a first embodiment of the illumination system according to the invention, the light generation device may be arranged in such a way that the directional light beam makes an input angle with respect to the surface normal of the light guide substrate between the total reflection angle arcsin $(1/n_1)$ and 85°, preferably 75°, particularly preferably 65° and more particularly preferably 55°, where $n_1$ is the refractive index of the light guide substrate. In this way, more significant overlapping of the light beams coupled out can be achieved in a straightforward way.

Furthermore, in another embodiment of the illumination system according to the invention, the light generation device may be adapted in such a way that the geometrical beam width of the directional light beam lies between 0.05 mm and 1 cm, preferably between 0.1 mm and 4 mm, and particularly preferably between 0.3 mm and 2 mm.

According to another embodiment, the holographic-optical output coupling substrate may be written monochromatically when the layer thickness of the holographic-optical output coupling substrate is at least less than 1 μm or when the layer thickness of the holographic-optical output coupling substrate is at least less than 3 μm and the input angle between the directional light beam and the surface normal lies between the total reflection angle arcsin $(1/n_1)$ and 65°, preferably between the total reflection angle arcsin $(1/n_1)$ and 55°. As an alternative, the holographic-optical output coupling substrate may be written with at least three lasers, preferably red, green and blue lasers, when the layer thickness of the holographic-optical output coupling substrate is at least more than 5 μm or the layer thickness of the holographic-optical output coupling substrate is at least more than 3 μm and the input angle between the directional light beam and the surface normal lies between the total reflection angle arcsin $(1/n_1)$ and more than 65°.

As already described, a corresponding number of light generation devices, such as laser diodes, may be provided for coupling in a plurality of directional light beams on the edge of the, in particular flatly formed, light guide substrate. In order to further reduce the energy consumption of the illumination system, according to a particularly preferred embodiment a further light guide substrate may be arranged on at least one edge of the light guide substrate. The further light guide substrate may be at least in optical contact with at least one further holographic-optical output coupling substrate comprising a multiplicity of output coupling regions. The at least one light generation device may be provided for coupling at least one directional light beam into the further light guide substrate. Preferably, just one light generation device may be provided. An output coupling region may be adapted in order to couple out a part of the directional light beam in the form of at least one directional subbeam in the direction of the edge of the light guide substrate and shine it in there. Preferably, the further holographic-optical output coupling substrate may be formed from a material as described above.

The further light guide substrate may essentially correspond to the light guide substrate described above. The further holographic-optical output coupling substrate which is in optical contact with the further light guide substrate may be adapted in order to couple directional light out of the further light guide substrate and, in particular, into the other light guide substrate. The number of light generation devices needed can be reduced significantly. In particular, a single light generation device, together with the further light guide substrate and the further holographic-optical output coupling substrate, may be adapted in order to shine two or more directional light beams into the first light guide substrate. In a corresponding way, the energy consumption can be reduced.

According to another embodiment of the illumination system, the light generation device may be adapted in order to emit light essentially monochromatically in the range of from 420 to 485 nm, preferably in the range of from 430 to 480 nm, and particularly preferably in the range of from 440 to 465 nm. The illumination apparatus may deviate the emitted light to a light modulator device. The illumination apparatus may comprise a layer having converting quantum dots, the quantum dots preferably being quantum dots converting from blue to green and/or from blue to red.

Yet another aspect of the invention is a liquid-crystal display comprising an illumination system as described above. The liquid-crystal display according to the invention may be used as an electronic display with a particularly advantageous colour space and in a compact, in particular flat, design. If optional rear mirroring arranged in the rear display housing is obviated, this liquid-crystal display is also suitable in particular as a transparent display with versatile applications in point-of-sale displays, advertising applications in window displays, in transparent information panels in airports, railway stations and other public places, in automobile applications, for example in the roof liner and as information displays in and on the dashboard and the front window, in window glass panes, in commercial refrigerators with transparent doors, and optionally as a curved display. Furthermore, this liquid-crystal display is suitable particularly for use in mobile telephones, smartphones and tablet PCs. The features of the apparatuses and systems may be combined freely with one another. In particular, features of the description and/or the dependent claims, even with full or partial avoidance of features of the independent claims, may be independently inventive individually or when freely combined with one another.

Figure 2A:
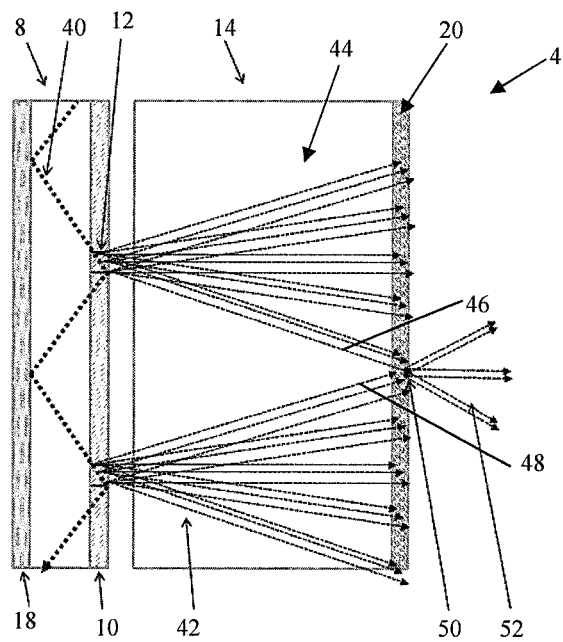
Figure 2B:
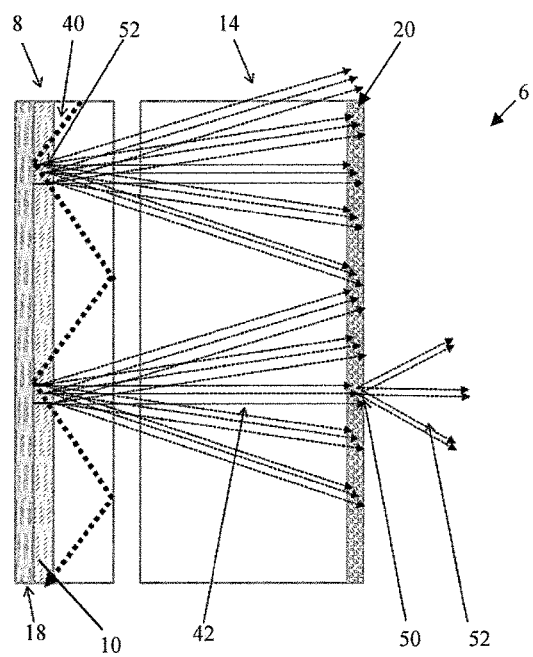
Figure 3:
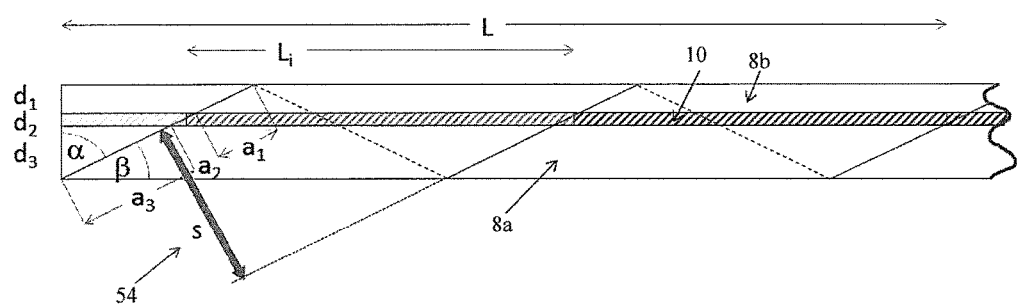
Figure 4:
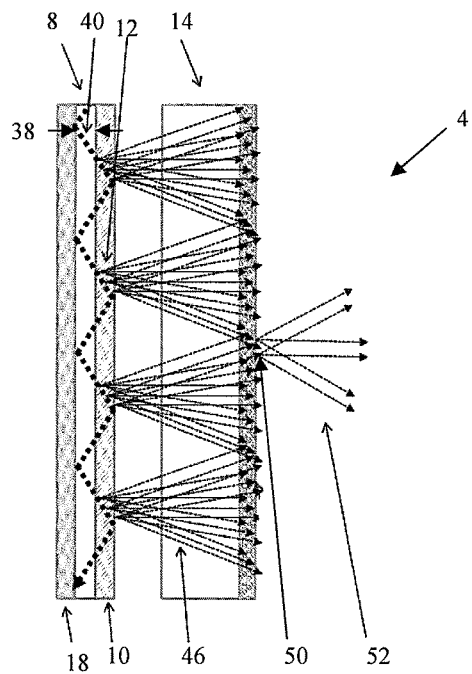
Figure 5:
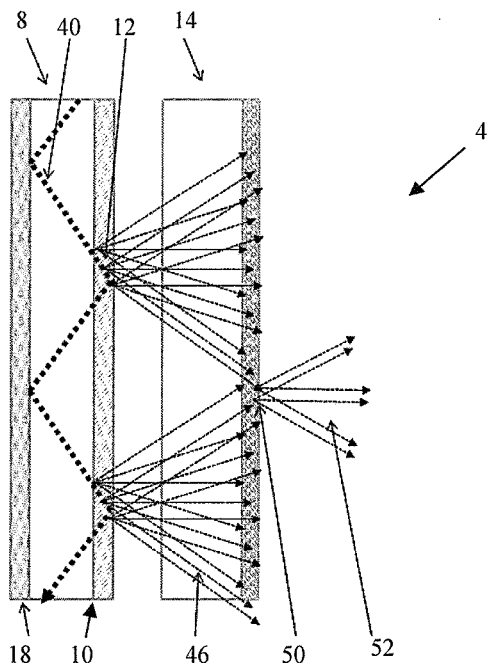
Figure 6:
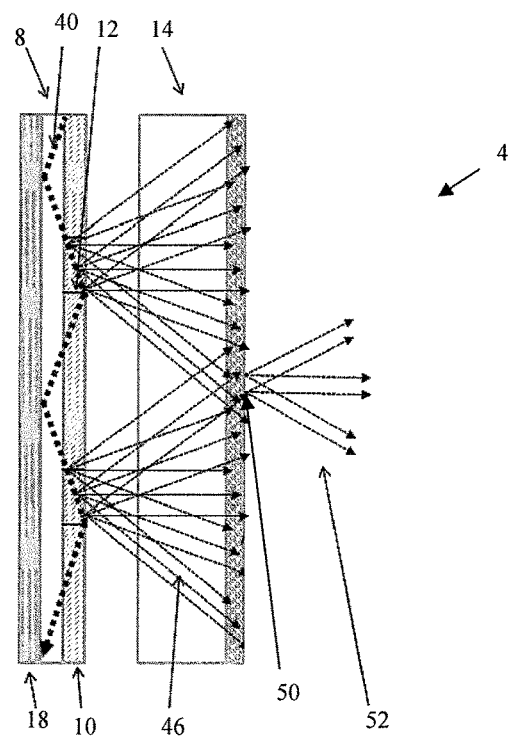
Figure 7:
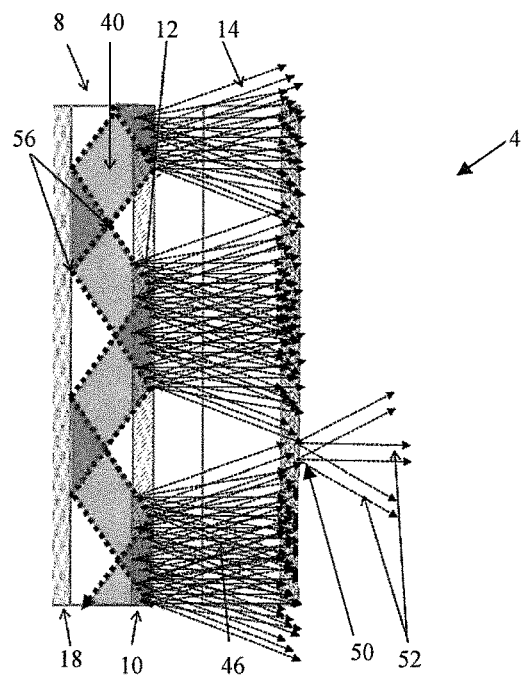
Figure 10:
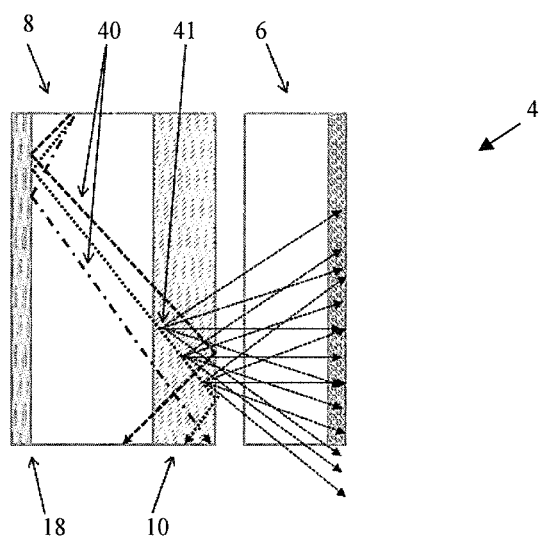
Figure 11:
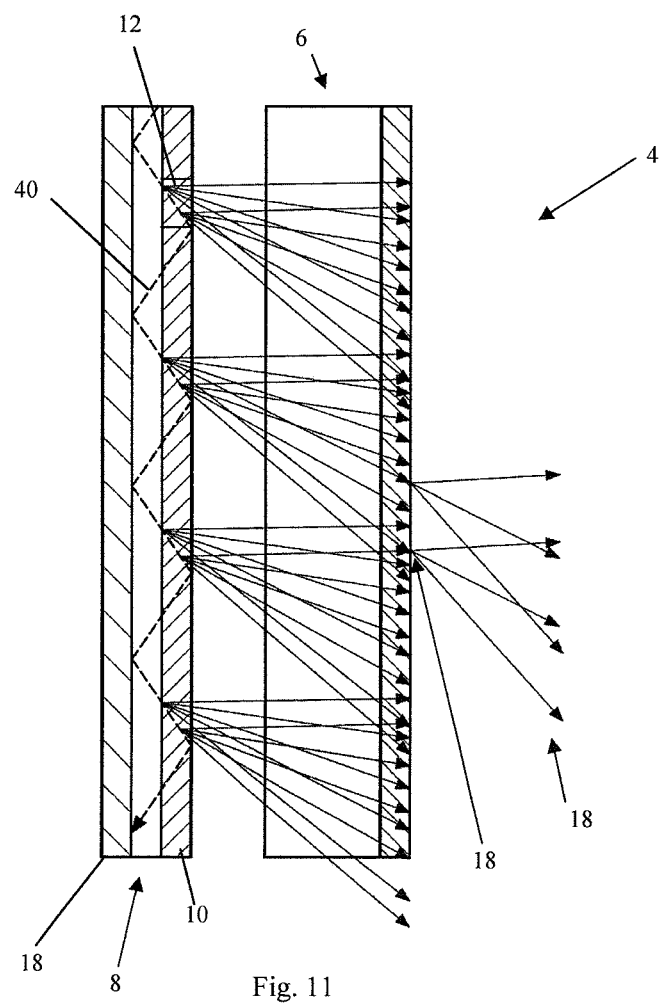
Figure 12:
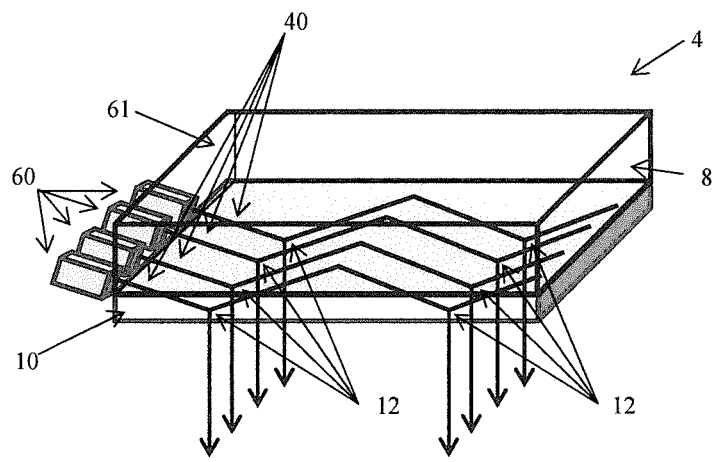
Figure 13:
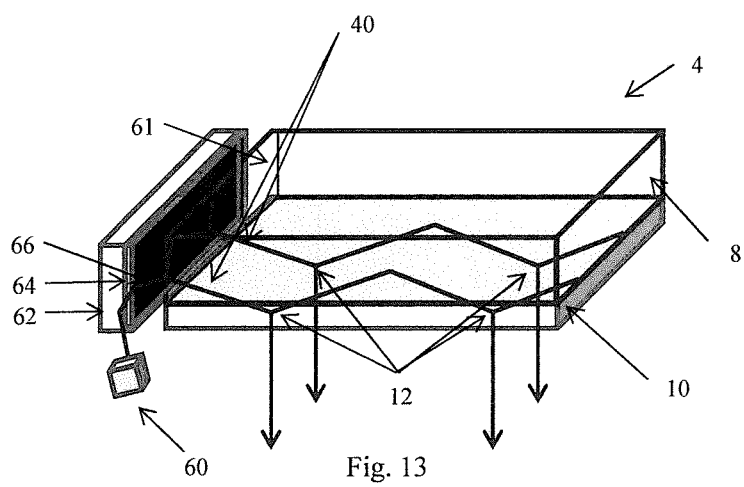
Figure 14:
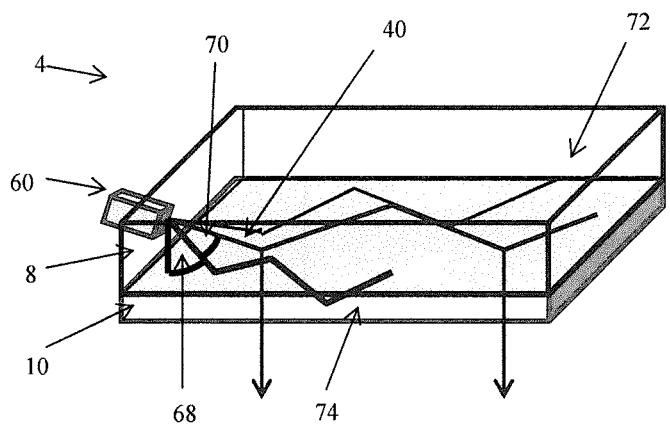
Figure 15A:
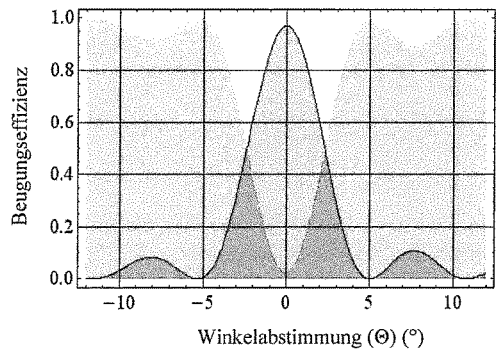
Figure 15B:
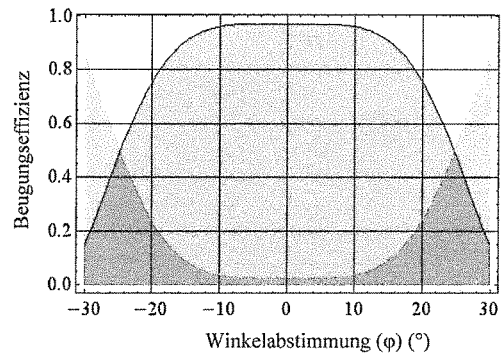
Figure 15C:
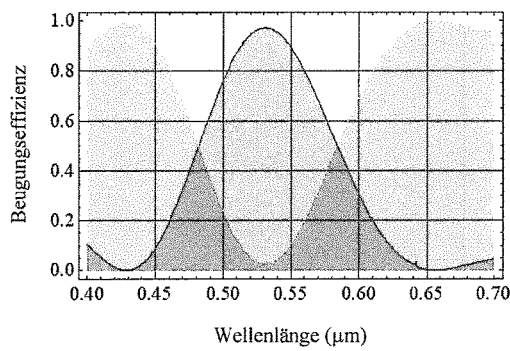
Figure 16A:
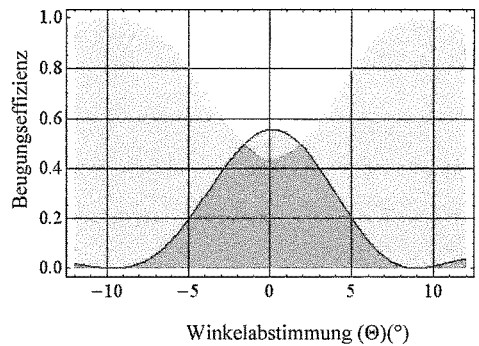
Figure 16B:
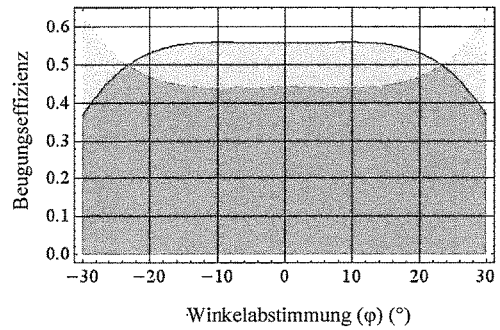
Figure 16C:
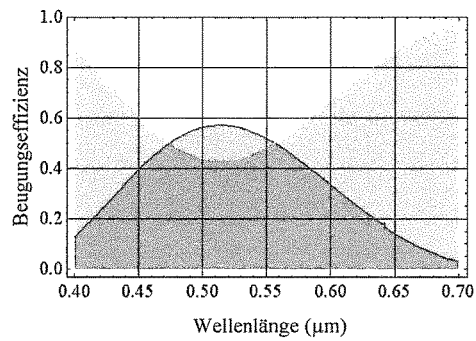
Figure 17A:
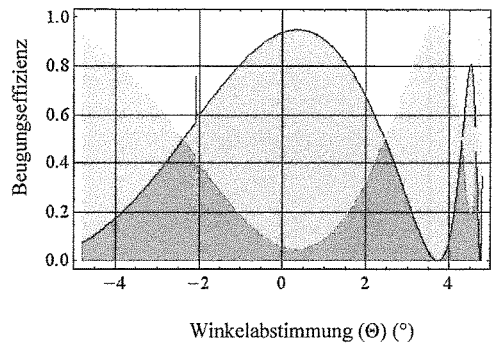
Figure 17B:
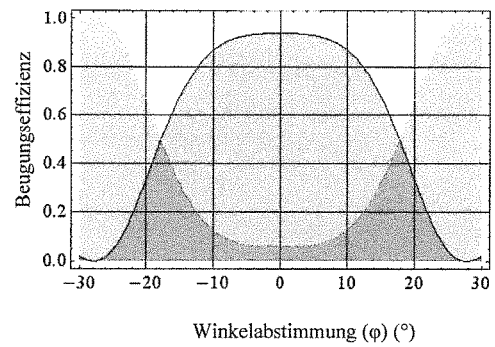
Figure 17C:
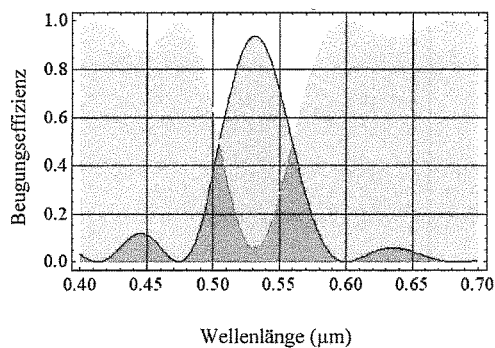
Figure 18A:
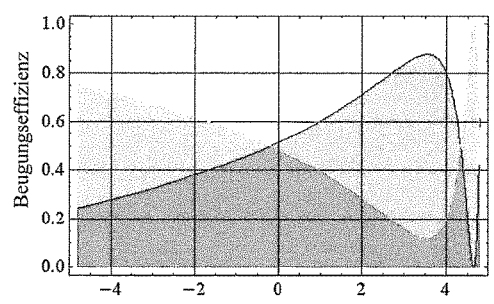
Figure 18B:
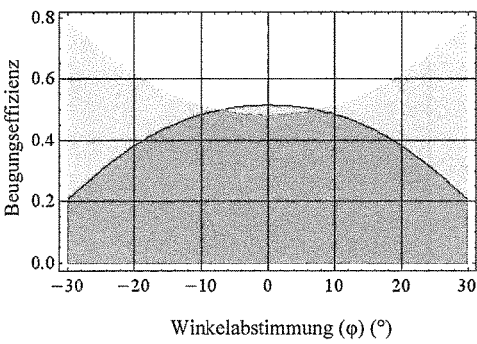
Figure 18C:
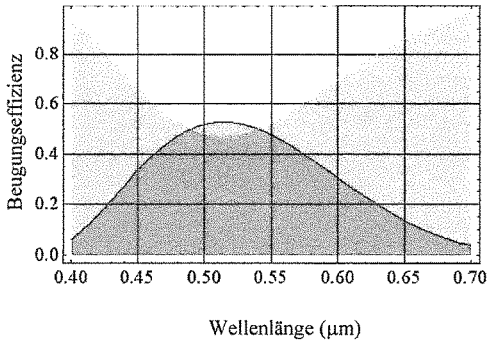
Figure 19A:
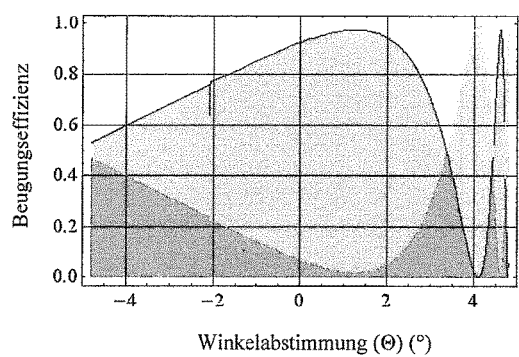
Figure 19B:
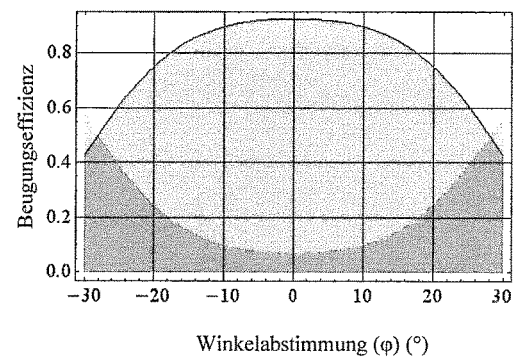
Figure 19C:
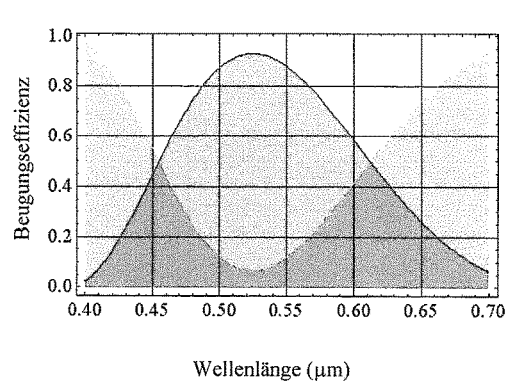

There are now a multiplicity of possibilities for configuring and further developing the illumination apparatus according to the invention, the illumination system according to the invention and the liquid-crystal display according to the invention. In this regard, reference is made on the one hand to the patent claims subsidiary to the independent claims, and on the other hand to the description of exemplary embodiments in conjunction with the drawing. In the drawing:

FIG. 1 shows a schematic view of a first exemplary embodiment of an illumination system according to the present invention, FIG. 2a shows a schematic view of a first exemplary embodiment of an illumination apparatus according to the present invention, FIG. 2b shows a schematic view of another exemplary embodiment of an illumination apparatus according to the present invention, FIG. 3 shows a schematic view to represent the diffraction of a directional light beam in a light guide substrate with a holographic-optical output coupling substrate, FIG. 4 shows a schematic view of another exemplary embodiment of an illumination apparatus according to the present invention, FIG. 5 shows a schematic view of another exemplary embodiment of an illumination apparatus according to the present invention, FIG. 6 shows a schematic view of another exemplary embodiment of an illumination apparatus according to the present invention, FIG. 7 shows a schematic view of another exemplary embodiment of an illumination apparatus according to the present invention, FIG. 8a shows a schematic view of another exemplary embodiment of an illumination system according to the present invention, FIG. 8b shows a schematic view of another exemplary embodiment of an illumination system according to the present invention, FIG. 9 shows a schematic view of another exemplary embodiment of an illumination apparatus according to the present invention, FIG. 10 shows a schematic view to represent an angular divergence of a directional light beam in a light guide substrate and an angular acceptance of the holographic-optical output coupling substrate, FIG. 11 shows a schematic view of another exemplary embodiment of an illumination apparatus according to the present invention, FIG. 12 shows a schematic view of another exemplary embodiment of an illumination system according to the present invention, FIG. 13 shows a schematic view of another exemplary embodiment of an illumination system according to the present invention, FIG. 14 shows a schematic view of another exemplary embodiment of an illumination system according to the present invention, FIGS. 15a-c show a schematic view of a Kogelnik simulation result with angular acceptance as a function of the change in the input angle by an angle $\Theta$ (FIG. 15a), angular acceptance by the angle $\varphi$ (FIG. 15b) and wavelength acceptance in μm (FIG. 15c) for a light guide substrate having a layer thickness of 5 μm and an input angle of 45° as well as diffraction efficiency for an index modulation of 0.04, FIGS. 16a-c show a schematic view of a Kogelnik simulation result with angular acceptance as a function of the change in the input angle by an angle $\Theta$ (FIG. 16a), angular acceptance by the angle $\varphi$ (FIG. 16b) and wavelength acceptance in μm (FIG. 16c) for a light guide substrate having a of 3 μm and an input angle of 45° as well as a diffraction efficiency for an index modulation of 0.04, FIGS. 17a-c show a schematic view of a Kogelnik simulation result with angular acceptance as a function of the change in the input angle by an angle $\Theta$ (FIG. 17a), angular acceptance by the angle $\varphi$ (FIG. 17b) and wavelength acceptance in μm (FIG. 17c) for a light guide substrate having a of 3 μm and an input angle of 85° as well as a diffraction efficiency for an index modulation of 0.022, FIGS. 18a-c show a schematic view of a Kogelnik simulation result with angular acceptance as a function of the change in the input angle by an angle Θ (FIG. 18a), angular acceptance by the angle φ (FIG. 18b) and wavelength acceptance in μm (FIG. 18c) for a light guide substrate having a of 1 μm and an input angle of 85° as well as a diffraction efficiency for an index modulation of 0.04, and FIGS. 19a-c show a schematic view of a Kogelnik simulation result with angular acceptance as a function of the change in the input angle by an angle Θ (FIG. 19a), angular acceptance by the angle φ (FIG. 19b) and wavelength acceptance in μm (FIG. 19c) for a light guide substrate having a of 1 μm and an input angle of 85° as well as a diffraction efficiency for an index modulation of 0.065.

In what follows, the same references will be used for elements which are the same.

FIG. 1 shows a schematic view of a first exemplary embodiment of an illumination system 2 according to the present invention. The illumination system 2 comprises an illumination apparatus 4 and a light modulator device 6.

In the present exemplary embodiment, besides a light modulator 28, the light-transmissive spatial light modulator device 6 comprises a first and a further polarizer substrate 32, 34, a colour filter substrate 30 and a front plate 36.

The light modulator 28, having an electronically drivable pixel structure, may be a liquid-crystal panel 28, such as a liquid-crystal module. As can be seen in FIG. 1, the colour filter substrate 30 in the present case is positioned between the polarization filter 34 and the front plate 36. It is to be understood that, according to other variants of the invention, other positions in the structure of a light-transmissive light modulator device 6 are also possible. In particular, further integration of the individual layers in one another is conceivable.

The optional front plate 36 may be made of plastic or glass. The front plate 36 may be smooth and/or roughened. The front plate 36 may have a diffuser module and/or comprise an antireflection layer.

The liquid-crystal module 28 may be configured in various forms. In particular, it is possible to use liquid-crystal switching systems which can achieve particular, advantageous and efficient light shadowing with different beam geometries and/or switching speeds. Preferably, twisted nematic (TN), super twisted nematic (STN), double super twisted nematic (DSTN), triple super twisted nematic (TSTN, film TN), vertical alignment (PVA, MVA), in-plane switching (IPS), S-IPS (super IPS), AS-IPS (advanced super IPS), A-TW-IPS (advanced true white IPS), H-IPS (horizontal IPS), E-IPS (enhanced IPS), AH-IPS (advanced high performance IPS) and ferroelectric pixel-based light modulators may be used as the light modulator 28.

The illumination apparatus 4 in the present exemplary embodiment comprises a spatial light guide substrate 8, a holographic-optical output coupling substrate 10 and a separate diffuser substrate 14. The light guide substrate 8 is adapted in order to guide a directional light beam by total reflection at the interfaces of the light guide substrate 8, or of the holographic-optical output coupling substrate 10.

The light guide substrate 8 and the holographic-optical output coupling substrate 10 are in optical contact with one another. In particular, the light guide substrate 8 comprises the holographic-optical output coupling substrate 10.

The optical contact between the light guide substrate 8 and the holographic-optical output coupling substrate 10 may be achieved by direct lamination of the holographic-optical output coupling substrate 10 onto the light guide substrate 8. As an alternative, the optical contact may be established by a liquid or an adhesive, such as a liquid adhesive or a transfer adhesive film.

For better total reflection, the side of the light guide substrate 8 facing away from the light modulator 28 may comprise an optional reflection layer 18, or mirror layer 18. A reflection layer 18 may for example be produced by a metallization method, for example laminating a metal foil on, metal vacuum deposition methods, application of a dispersion of colloids containing metal with subsequent sintering, or by applying a solution containing metal ions with a subsequent reduction step. As an alternative or in addition, by a coating with an especially lower refractive index, it is possible to improve the waveguide properties of the light guide substrate 8. Furthermore, it is possible to use multilayer constructs which have alternating refractive indices and layer thicknesses. Such multilayer constructs having reflection properties may comprise organic or inorganic layers, the layer thicknesses of which are of the same order of magnitude as the wavelength(s) to be reflected. As can be seen in FIG. 1, the reflection layer 18 is in optical contact with the light guide substrate 8.

The holographic-optical output coupling substrate 10 is formed in the present case from a recording material for volume holograms. Typical materials are holographic silver halide emulsions, dichromatic gelatins or photopolymers. Photopolymers comprise at least photoinitiator systems and polymerizable writing monomers. Special photopolymers may also additionally comprise plasticizers, thermoplastic binders and/or crosslinked matrix polymers. Crosslinked matrix polymers comprising photopolymers may be used. In an illumination apparatus 4 according to the invention, photopolymers of a photoinitiator system, one or more writing monomers, plasticizers and crosslinked matrix polymers may particularly preferably be used.

The holographic-optical output coupling substrate 10 may furthermore have a plurality of layers. For example, a holographic-optical output coupling substrate 10 may comprise an optically transparent substrate and a photopolymer. With a corresponding design, it is particularly preferred for the photopolymer to be laminated directly on the light guide substrate 8.

The holographic-optical output coupling substrate 10 may also be formed in such a way that the photopolymer is enclosed by two thermoplastic films. In this case, it is particularly advantageous for one of the two thermoplastic films adjacent to the photopolymer to be bonded to the light guide substrate 8 by means of an optically clear adhesive film.

The thermoplastic film layers of the holographic-optical output coupling substrate 10 may be formed from transparent plastics. Essentially birefringence-free materials, such as amorphous thermoplastics, may preferably be used. Exemplary and nonlimiting materials are polymethyl methacrylate, cellulose triacetate, amorphous polyamides, polycarbonate and cycloolefins (COC). Preferably, the thermoplastic film layers may be optically clear, nonscattering thermoplastics. In particular, birefringence-free, non-scattering thermoplastic films may be used.

By way of example, two directly neighbouring output coupling regions 12 are represented in the present exemplary embodiment. It is to be understood that a multiplicity of output coupling regions 12 may be provided, and that these may depend, in particular, on the directional light beam coupled in. The light guide substrate 8 has a layer thickness 38. The layer thickness 38 in the present case lies between 30 μm and 10 mm, preferably between 100 μm and 2 mm, and particularly preferably between 300 μm and 1 mm. Furthermore, the illumination apparatus 4 has a layer thickness 39 which, owing to the separate diffuser substrate 14 and the holographic-optical output coupling substrate 10, is greater than the layer thickness 38.

The diffuser substrate 14 may in the present case be formed from a transparent substrate 19 and a diffusely scattering layer 20. The diffusely scattering layer 20 may be a volume scatterer. The diffusely scattering layer 20 may, for example, comprise organic or inorganic scattering particles, which may be embedded in a carrier layer. The scattering particles and the carrier layer have different refractive indices. In a preferred embodiment, the scattering particles are optically nonabsorbent and quasi-spherical.

In the present case, an interlayer 24, in particular an air gap 24, is arranged between the holographic-optical output coupling substrate 10 and the diffuser substrate 14. The refractive index of the interlayer 24 is at least less than the refractive index of the adjacent layer. According to another variant of the invention, arranged between the holographic-optical output coupling substrate 10 and the diffuser substrate 14 there may also be a low refractive index adhesive layer, a low refractive index contact liquid, a low refractive index surface modification of the diffuser substrate 14, or a low refractive index surface modification light guide substrate 8 or of the holographic-optical output coupling substrate 10. It is to be understood that various layers may be combined with one another.

In addition, further layers 22 and 26 are provided. These may be formed in a corresponding way to the interlayer 24. In particular, the refractive index of the interlayer 22, 26 may be at least less than the refractive index of the respective adjacent layer/s. In the present case, an air gap 22, 26 is respectively provided. The exemplary embodiment according to the invention ensures that the light coupled out strikes the light modulator 28 with sufficient homogeneity, as will be explained below.

FIG. 2a shows a schematic view of a first exemplary embodiment of an illumination apparatus 4 according to the present invention. In particular, FIG. 2a shows a detail of the illumination system 2 of FIG. 1.

The directional light beam 40 shone in by a light generation device (not represented), such as a laser light source, follows the total reflection and propagates in the light guide substrate 8. The interface between the light guide substrate 8 and the air gap 24, or the reflection layer 18, serves as the total reflection interface. If the holographic-optical output coupling substrate 10 is intended to comprise further thermoplastic layers, then the total reflection takes place on the layer which has direct contact with the air gap 24.

When the directional light beam 40 passes through the holographic-optical output coupling substrate 10, light intensity is partially diffracted away in the respective output coupling region 12. A part of the light beam 40 is diffracted away in the direction of the light-transmissive pixel-based light modulator 28. The present holographic-optical output coupling substrate 10 is furthermore adapted in order to widen a part of the light beam 40.

The light beams 42, 44 diffracted away strike the scattering layer 20, which is positioned on the separate diffuser substrate 14. In the diffusely scattering layer 20, the light beams 42, 44 are diffusely widened. It can be seen that the outer light beams 46, 48 of two neighbouring output coupling regions adjoin one another, so that the emitted light intensity of the entire diffuser substrate 14 is already homogeneous. The illumination apparatus 4 in FIG. 2a is distinguished in that the divergent light beams 42, 44 of the individual light beam passes of the light beam 40 through the holographic-optical output coupling substrate 10 already intersect one another in the diffuser substrate 14, i.e. before exit from the diffuser substrate 14, onto the light modulator 28. For a better overview, only a few light beams 52 are represented from a point 50. It is to be understood that a homogeneous light intensity is generated in the exemplary embodiment according to FIG. 2a.

Furthermore, the holographic-optical output coupling substrate 10 is provided with an angle-widening property, which may be produced by various measures. For example, the angular divergence of the laser beam 40 and the angular acceptance of the holographic-optical output coupling substrate 10 may be adapted to one another when writing the holographic-optical output coupling substrate 10, in such a way that the angular divergence of the laser beam 40 is imaged as the angular divergence of the beams 42 and 44. The holographic-optical output coupling substrate 10 may also have its own diffuser property or be formed from a multiplexed structure consisting of a plane-wave object beam and plane-wave reference beam. Furthermore, the holographic-optical output coupling substrate 10 may be formed from a selectively multiplexed structure consisting of a spherical-wave object beam and a plane-wave reference beam, or from a selectively multiplexed structure consisting of a spherical-wave object beam and a spherical-wave reference beam. It is to be understood that the measures described above may also be combined with one another.

The exemplary embodiment of the illumination apparatus 4 according to the invention, as represented in FIG. 2b, differs from the exemplary embodiment represented in FIG. 2a in that the holographic-optical output coupling substrate 10 is arranged on the other surface side of the light guide substrate 8. In particular, in this exemplary embodiment the holographic-optical output coupling substrate 10 adjoins the optional reflection layer 18.

FIG. 3 shows a schematic view to represent the diffraction of a directional light beam in a light guide substrate 8a, 8b having a holographic-optical output coupling substrate 10. In particular, geometrical dependencies of the holographic-optical output coupling substrate 10 and of the light guide substrate 8a, 8b are shown with the aid of FIG. 3.

The holographic-optical output coupling substrate 10 is in the present case protected by two thermoplastic layers 8a and 8b, which constitute the light guide substrate 8. For example, the transparent layer 8a of FIG. 3 may correspond to the light guide substrate 8 of FIG. 1. It is likewise possible to obviate one of the two layers 8a and 8b and to position only the holographic-optical output coupling substrate 10 on the light guide substrate 8.

The path length of the light beam through the holographic-optical output coupling substrate 10 is given by:

$$P_2 = 2 \cdot n \cdot a_2 = 2 \cdot n \cdot d_2 / \sin \beta, \qquad (a)$$

where n is the number of defined output coupling regions of the light beam from the combination of light guide substrate 8 and holographic-optical output coupling substrate 10, $d_2$ is the layer thickness of the holographic-optical output coupling substrate 10, $a_2$ is the path length through an element n of the holographic-optical output coupling substrate 10, and α is the angle of incidence or input angle of the laser in the medium relative to the surface normal of the light guide substrate edge.

The angle β is therefore given directly by the relation $$\beta = \alpha - 90° \qquad (b)$$

Furthermore, the path length of the light beam through the thermoplastic layers 8a, 8b is given by the following formula:

$$P_{1+3} = 2 \cdot n \cdot (d_1 + d_3) / \sin \beta, \qquad (c)$$

where $d_1+d_3$ is the total thickness of the thermoplastic layers 8a, 8b, and α is the angle of incidence or input angle of the laser in the medium relative to the surface normal of the light guide substrate edge. The angle β is given by relation (b).

The total length L of the light guide substrate is accordingly given as:

$$L = 2n(d_1+d_2+d_3)/\tan\beta. \quad (d)$$

Furthermore, the theoretical geometrical beam width S can be determined by the following formula:

$$S = \cos(90°-2\beta)(d_1+d_2+d_3)/\sin\beta. \quad (e)$$

It has, however, been discovered that in practice it is impractical and not cost-efficient to adjust the beam width of the light generation device, such as a laser, precisely to S. Rather, any other beam width is likewise suitable. Various embodiments according to the invention are formed in such a way that the effective laser aperture can be adjusted from 0.1 S to 5.0 S.

The laser aperture represents the diameter of the light beam effectively shone into the light guide substrate 8. The beam intensity of the laser beam can be varied as a function of the laser aperture. Preferably, a Gaussian intensity profile can be used. It is to be understood that other profiles, for example using other transverse modes of the laser, are also conceivable.

The effective laser aperture preferably represents the widest distance between two regions of the laser beam which present at least 50% of the maximum light intensity. For a purely Gaussian light beam profile, this corresponds to the "full width half maximum" (FWHM).

In principle, there are two effective laser apertures in the two dimensions, which are defined orthogonally to the light propagation direction. It will, however, be assumed below that the two laser apertures are almost equal in size, although in a particular application this may not be the case.

Furthermore, the laser aperture can be adjusted to be greater than S, so that the overlap of a Gaussian intensity profile on the outer side overlaps in such a way that the effective intensity there is at least 30% of the maximum intensity. Furthermore, it is possible to adjust the laser aperture of the laser beam using a multiple of S, in order to permit particularly easy mounting. It may likewise be advantageous to select the laser aperture to be less than S, in order to permit a particularly precise constant intensity distribution of all the split light beams. As already described, the beam width is preferably to be adjusted in such a way that the effective laser aperture is adjusted to be from 0.1 S to 5.0 S.

The number of light sources generated by the coupling out by means of the holographic-optical output coupling substrate 10 corresponds to the number n of output coupling regions. The number is determined by the total length of the illumination apparatus 4, the angle of incidence α of the light beam 40 into the light guide substrate 8 and by the total layer thickness $(d_1+d_2+d_3)$. Per meter of light guide substrate length, there will therefore be between a few tens and a few thousand beam passes through the holographic-optical output coupling substrate 10 with a corresponding number n of output coupling regions, or diffracted light centres n.

It is to be understood that, in a spatial light guide substrate used in practice, a plurality of light sources are generated owing to the spatiality.

The diffraction efficiency of the holographic-optical output coupling substrate 10 may (ideally) increase as follows along the light guide substrate starting from the input point from output coupling region to output coupling region of equal length L in order to couple out the same light intensity I in each subsegment:

$$I = DE_1 \cdot I_0, \quad (f)$$

where I is the intensity of the diffracted light coupled out in the first output coupling region, $I_0$ is the initial intensity and $DE_1$ is the diffraction efficiency of the first output coupling region.

$$I = DE_2 \cdot (I_0 - I) = DE_2 \cdot (I_0 - DE_1 \cdot I_0) = I_0 \cdot DE_2 \cdot (1 - DE_1) \quad (g)$$

$$DE_2 = DE_1/(1 - 1 \cdot DE_1), \quad (h)$$

where $DE_2$ is the diffraction efficiency of the second output coupling region.

$$I = DE_3 \cdot (I_0 - 2 \cdot I) = DE_3 \cdot (I_0 - 2 \cdot DE_1 \cdot I_0) = I_0 \cdot DE_3 (1 - 2DE_1) \quad (i)$$

$$DE_3 = DE_1/(1 - 2 \cdot DE_1), \quad (j)$$

where $DE_3$ is the diffraction efficiency of the third output coupling region, etc. The following general relation can be derived therefrom:

$$DE_n = DE_1/(1 - (n-1) \cdot DE_1). \quad (k)$$

Since $DE_n$ can be at most 1, $DE_1$ is given as at most 1/n.

If intensity is additionally lost by absorption and/or scattering per output coupling region, for instance the fraction ε·I instead of I with ε≥1, then it similarly follows for the $i^{th}$ output coupling region that:

$$DE_i = DE_1/(1 - (i-1) \cdot \varepsilon \cdot DE_1) \quad (l)$$

and $$DE_n = DE_1/(1 - (n-1) \cdot \varepsilon \cdot DE_1) \quad (m)$$

and $$DE_1 \leq 1/(\varepsilon \cdot n). \quad (n)$$

As an alternative to a holographic-optical output coupling substrate 10 formed in one piece, the holographic-optical output coupling substrate may be formed from a multiplicity of individual holograms connected to one another. The individual holograms may, in particular, be volume holograms which were written by two-beam interference and adapted exposure in their diffraction efficiency $DE_i$. For instance, the diffraction efficiency may be modified by changing the exposure dose, for example by shadowing, by varying the beam intensity ratio (beam ratio) or by adapted incoherent preexposure to reduce the dynamic range of the recording material.

Furthermore, an individual hologram may be formed in such a way that it can only diffract radiation of one of the three primary colours red, green and blue. It is to be understood that it is also possible to use more than three primary colours, such as four primary colours, for example "red", "green", "blue" and "yellow". Furthermore, it is possible to holographically represent special colour arrangements with interleaved colour points, for example the RGBG layout with alternating red and blue pixels, which accommodates, in particular, the colour sensitivity of the human eye.

The use of a plurality of individual holograms, which only diffract particular selected laser wavelengths, can be achieved in particular with photopolymer layer thicknesses of more than 5 μm. For example, it is possible to laminate three photopolymer layer thicknesses, each of more than 5 μm, on one another and write each of them beforehand. It is also possible to use just one photopolymer layer larger than 5 µm, if all at least three colour-selective holograms are written simultaneously or successively, or partially overlapping in time, into this one photopolymer layer. As an alternative to the options described above, it is also possible to use photopolymer layers smaller than 5 µm, preferably smaller than 3 µm and particularly preferably smaller than 3 µm and larger than 0.5 µm. For this case, only one individual hologram is written, preferably with a wavelength which is close to the spectral middle of the visible electromagnetic spectral range or close to the geometrical average of the two wavelengths of the longest-wavelength laser and the shortest-wavelength laser of the illumination system with directional laser light.

For the photopolymer layer thicknesses given above, the angle of incidence of the writing laser beam in the medium relative to the surface normal of the light guide substrate edge may be suitably adapted between the total reflection angle arcsin $(1/n_1)$, for example 41.8° for a light guide substrate refractive index $n_1$=1.5, and 85°. It is likewise to be taken into account that economical and sufficiently strong laser device are available. Frequency-doubled Nd:YVO$_4$ crystal lasers at 532 nm and argon ion lasers at 514 nm are preferred.

The production of volume holograms may, for example, be carried out by two-beam interference. In another method for mass replication of reflection-volume holograms, a light-sensitive material is positioned on a master hologram and subsequently copied by means of coherent light. The production of holograms may be carried out by means of roll replication.

In particular, reference is also made to the production of edge-lit holograms, which require special exposure geometries. In such a method, writing is carried out on the basis of a special optical adapter block.

The holographic-optical output coupling substrate 10, which can be produced in the illumination apparatus 4 according to the invention with directional laser light, may preferably be an edge-lit hologram. The reason for this is that it can work with steeply incident light in the light guide substrate, which propagates with total reflection in the lightwave guide plate/edge-lit hologram combination.

FIG. 4 shows a schematic view of another exemplary embodiment of an illumination apparatus 4 according to the present invention. The illumination apparatus 4 of the present exemplary embodiment differs from the previous exemplary embodiments particularly in that the layer thickness 38 of the light guide substrate 8 is reduced. In particular, the layer thickness 38 lies between 100 µm and 2 mm, and particularly preferably between 300 µm and 1 mm. Owing to a correspondingly small layer thickness 38, the number of passes of the laser beam 40 through the holographic-optical output coupling substrate 10 can be increased. The number n of output coupling regions 12 is increased correspondingly. The effect of this is that the light beams 46 diffracted away already overlap in the diffusely acting layer of the diffuser substrate 14. The layer thickness of the illumination apparatus 4 can be reduced even further.

FIG. 5 shows a schematic view of another exemplary embodiment of an illumination apparatus 4 according to the present invention. The exemplary embodiment according to FIG. 5 differs from the previous exemplary embodiments particularly in that the holographic-optical output coupling substrate 10 has been provided with a particular angular divergence. The angular divergence, which is defined as the widening angle between the outer beam components, in which 50% of the maximum light intensity is radially measured, in the present case preferably lies between 5° and 60° and particularly preferably between 10° and 45°. This entails significant widening of the light beams 46 diffracted away. The effect of this is that the light beams 46 diffracted away already overlap in the diffusely acting layer of the diffuser substrate 14. The layer thickness of the illumination apparatus 4 can be reduced even further.

FIG. 6 shows a schematic view of another exemplary embodiment of an illumination apparatus 4 according to the present invention. The exemplary embodiment according to FIG. 6 differs from the previous exemplary embodiments particularly in that the holographic-optical output coupling substrate 10 has been provided with a larger angular divergence and the angle of incidence α of the directional light beam 10 has been set more steeply. The angle of incidence α of the laser beam 40 relative to the surface normal of the light guide substrate 8 in the present case lies between the total reflection angle arcsin $(1/n_1)$ (for example 41.8° with a light guide refractive index of $n_1$=1.5) and 75°, particularly preferably 60°. The effect of this is that the light beams 46 diffracted away already overlap in the diffusely acting layer of the diffuser substrate 14. The layer thickness of the illumination apparatus 4 can be reduced even further.

FIG. 7 shows another schematic view of an exemplary embodiment according to the invention. In this exemplary embodiment, the beam width 56 of the directional light beam 40, in particular a laser beam 40, is of the order of magnitude of the layer thickness of the light guide substrate 8 in contrast to the previous exemplary embodiments. The geometrical beam width S of the laser beam 40 shone in may in the present case lie, for example, between 0.1 mm and 4 mm, and particularly preferably between 0.3 mm and 2 mm. The effect of this is that the light beams 46 diffracted away already overlap in the diffusely acting layer of the diffuser substrate 14, and the number n of beam passes through the holographic-optical element 10 can be kept small. The layer thickness of the illumination apparatus 4 can be reduced even further.

From the preceding exemplary embodiments, it is clear that various measures may be carried out in order to optimize the illumination apparatus 4, for example in terms of its layer thickness, and these may be combined with one another. In particular, in an illumination apparatus 4 according to the invention the geometrical considerations of the distance from the holographic-optical output coupling substrate 10 to the scattering layer 20 of the diffuser substrate 14 (see FIG. 2), the layer thickness 38 of the light guide substrate 8 (see FIG. 4), the angular divergence of the diffraction of the holographic-optical output coupling substrate 10 (see FIG. 5), the angle of incidence of the directional light beam 11 (cf. FIG. 4 with FIG. 6) and the geometrical beam width 56 (see FIG. 7) of the light beam may be optimized in such a way that an illumination apparatus 4 with a particularly small layer thickness can be produced, which simultaneously ensures that the light beams 46 diffracted away already adjoin one another or even overlap in the diffusely acting layer 20 of the diffuser substrate 14.

The distance between the holographic-optical output coupling substrate 10 and the diffuser substrate 14, in particular as far as the scattering layer 20 of the diffuser substrate 14, may lie between 20 µm and 1 cm, preferably between 50 µm and 4 mm, and particularly preferably between 100 µm and 500 µm.

FIGS. 8a and 8b each show another schematic view of another exemplary embodiment of an illumination system 2 according to the present invention.

The exemplary embodiment represented in FIG. 8a or 8b comprises an illumination apparatus 4 and a light modulator device 6. The light modulator device 6 represented corresponds essentially to the light modulator device 6 of FIG. 1, so that reference is made to the corresponding text in order to avoid repetition.

The illumination apparatus 4 of FIG. 8a differs from the previously described exemplary embodiments particularly in that the diffuser module 58 is integrated in the holographic-optical output coupling substrate 10. A separate diffuser substrate is not necessary. By means of this, in particular, the layer thickness 39 of the illumination apparatus 4 can be reduced further. In particular, the layer thickness 39 is essentially determined by the sum of the layer thickness 38 of the light guide substrate 8 and the layer thickness of the holographic-optical output coupling substrate 10.

As already described, the optical function of the diffuse beam widening is implemented in the present case by the holographic-optical output coupling substrate 10 itself. The present interlayer 25 may be formed according to the previously described interlayers 24, 26. In this case as well, the beams diffracted away already overlap before exit from the diffuser module 58.

The exemplary embodiment of the illumination apparatus 4 according to the invention, as represented in FIG. 8b, differs from the exemplary embodiment represented in FIG. 8a in that the holographic-optical output coupling substrate 10 is arranged on the other surface side of the light guide substrate 8.

In particular, in this exemplary embodiment the holographic-optical output coupling substrate 10 adjoins the optional reflection layer 18.

In the exemplary embodiment according to FIG. 9, a sufficiently large geometrical beam width S is used, which together with the diffuser module 58 allows a homogeneous intensity distribution in the holographic-optical output coupling substrate 10 comprising the diffuser module 58. The holographic-optical output coupling substrate 10 diffracts the laser light 40 in the direction of the light modulator device 6 in such a way that it is diffusely scattered in addition.

The exemplary embodiments of an illumination apparatus 4, as represented in FIGS. 8 and 9, are distinguished in particular in that diffuse diffraction takes place in the holographic-optical output coupling substrate 10. Furthermore, it is advantageous when (almost) complete illumination of the holographic-optical output coupling substrate 10 takes place. The latter can be achieved in that the directional light beam 40 with an adapted angle of incidence of the light beam 40 and its effective aperture, as well as the layer thickness 38 of the light guide substrate 8, are selected in such a way that complete illumination of the holographic-optical output coupling substrate 10 is achieved.

FIG. 10 shows a schematic view to represent an angular divergence of a directional light beam in a light guide substrate 8 and an angular acceptance of the holographic-optical output coupling substrate 10. As can be seen in FIG. 10, only the middle light beam 41 of the three light beams 40, 41 represented is diffracted away in an output coupling region. The light beams 40, which have a (slightly) different angle of incidence from the light beam 41, are not diffracted. This effect can be used when a holographic-optical output coupling substrate 10 is formed from a plurality of frequency-selective individual or partial holograms. For example, different sub holograms may be formed for red, green and blue laser light. The layer thickness may be selected to be more than 5 µm. The angle selection may be adjusted in such a way that the angle selection lies between 1° and 6°. For this exemplary embodiment according to the invention, the laser beam divergence likewise lies in this range, in order to diffract light away effectively by the holographic-optical output coupling substrate 10. The essential advantage is the possibility of adaptation in order to avoid chromatic aberrations, and general colour adaptation by the individual adaptation of the diffraction efficiency for each colour. In particular, it is possible to selectively assign each of the individual colour lasers an individual angle selection range, or to assign all the colour lasers the same angle selection range.

The at least three different individual holographic-optical holograms respectively configured for one primary colour may likewise be exposed into the same layer or into a plurality of layers. If a plurality of layers are used, these may be laminated directly on one another or bonded by means of adhesive layers.

Preferably, a layer thickness of the holographic-optical output coupling substrate 10 may be produced in the range of between 0.5 µm and 5 µm. In this way, an angle selection of about 5° to 30° is produced. In this case, the beam divergence places a low requirement on the precision of the light source mounting and has the advantage that only one individual hologram needs to be exposed, which deviates light for all colours. For efficient light utilization, it is furthermore preferred for the beam divergence of the laser light to be less than the angle selection range of the holographic-optical output coupling substrate 10.

Another exemplary embodiment, according to the invention, of an illumination apparatus 4 is shown in FIG. 11. In this exemplary embodiment, the holographic-optical output coupling substrate 10 is adapted in order to direct the directional light beam 40 obliquely onto the spatial light modulator (not represented). The effect of this is that only an observer standing obliquely with respect to the LC display is able to see. This can be advantageous when display mounting for a particular application is not possible in another way, but the observer should see the display from a non-central position. The automotive sector may be mentioned as an example of this.

FIG. 12 shows a schematic view of another exemplary embodiment of an illumination system according to the present invention. In particular, a perspective view is depicted. As can be seen from FIG. 12, a multiplicity of light generation devices 60 are arranged on an edge 61 of the illumination apparatus 4, in particular of the light guide substrate 8. The light generation devices 60 may be laser light sources 60.

The structure shown in FIG. 12 allows beam splitting by the holographic-optical output coupling substrate 10 for each laser light source 60 separately. This has the advantage of allowing good thermal management since in this way less heat is locally generated by the laser light sources 60 and the thermal dissipation is therefore achieved better.

FIG. 13 shows a schematic view of another exemplary embodiment of an illumination system according to the present invention. In particular, a perspective view is again depicted. In the present exemplary embodiment, in contrast to the preceding exemplary embodiment, only one light generation device 60, such as a laser light source 60, is required. For example, an RGB laser 60 may be used.

Besides the one light generation device 60, the present illumination system comprises a further light guide substrate 62 having a further holographic-optical output coupling substrate 64. The further light guide substrate 62 is positioned laterally on the first light guide substrate 8. The further light guide substrate 62 is, in particular, in optical contact with the further holographic-optical output coupling substrate 64.

The directional light beam 66, in particular laser beam 66, coupled into the further light guide substrate 62 by the light generation device 60 is firstly divided along the further light guide substrate 60 in the manner described above into a multiplicity of directional light beams 40, in particular laser beams 40, which are subsequently shone into the light guide substrate 8.

In the first light guide substrate 8—as described above—a multiplicity of light beams are coupled out in the output coupling regions 12. The advantage of this structure is that n*m light beams 40 can be generated from one laser beam light source 60. It is to be understood that a plurality of laser light sources 60 may be used. These can all couple into the further light guide substrate 62, for example in order to permit improved thermal dissipation and/or to produce an even brighter display. Positioning on the rear or front side of the light guide substrate 8, or the holographic-optical output coupling substrate 10, is also possible.

A desired angle of incidence α into the light guide substrate 8 can be adjusted by slightly tilting the elements 60 and 62. As an alternative, the further holographic-optical output coupling substrate 64 may be exposed in such a way that it emits with orthogonal arrangement on 8 simultaneously with the angle α.

FIG. 14 shows a schematic perspective view of another exemplary embodiment of an illumination system according to the present invention. In this exemplary embodiment, it is shown that the directional light beam, in particular a laser beam of the laser diode 60, can be widened uniaxially in the plane of the light guide substrate 8 by the angle β (70) before being coupled into the light guide substrate 8. In other words, the natural divergence of a laser diode emitter 60 in the direction perpendicular to the light guide substrate 8 can be used. With a suitable selection of the photopolymer layer thickness and exposure geometry, the diffraction efficiency for light beams, which in FIG. 14 travel forwards (light beam 74) or backwards (light beam 72), can be kept almost as great as that of the straight light beam 40 in a wide angle range. The advantage of a corresponding arrangement is that the number of laser diodes to be used, which are necessary for homogeneous lighting, can be reduced significantly. Reference 68 in this case denotes the angle of incidence α.

FIGS. 15 to 19 show schematic views of Kogelnik simulation results with angular acceptance as a function of the change in the angle of incidence α by an angle Θ, angular acceptance as a function of the change in the lateral angle of incidence β (70) by an angle φ and wavelength acceptance in μm for various light guide substrates. In particular, various combinations of diffraction efficiencies as a function of angle of incidence α (FIG. 14, see reference 68) and incidence divergence in the plane of the lightwave plate (FIG. 14, see reference 70) according to Kogelnik theory are specified.

FIGS. 15 a-c show the results with the assumption of a layer thickness of 5 μm, an input angle α of 45° and an index modulation of 0.04.

FIGS. 16 a-c show the results with the assumption of a layer thickness of 3 μm, an input angle α of 45° and an index modulation of 0.04.

FIGS. 17 a-c show the results with the assumption of a layer thickness of 3 μm, an input angle α of 85° and an index modulation of 0.022.

FIGS. 18 a-c show the results with the assumption of a layer thickness of 1 μm, an input angle α of 85° and an index modulation of 0.04.

FIGS. 19 a-c show the results with the assumption of a layer thickness of 1 μm, an input angle α of 85° and an index modulation of 0.065.

For this case of the light input, further preferred ranges arise: the holographic-optical output coupling substrate 10 may be formed by a monochromatic hologram preferably written by a 500-600 nm green laser, when the layer thickness of the holographic-optical output coupling substrate 10 is at least less than 1 μm. Likewise, the layer thickness of the holographic-optical output coupling substrate 10 may is at least less than 3 μm and at the same time the angle of incidence α may lies between the total reflection angle arcsin $(1/n_1)$ and 65°, preferably between the total reflection angle arcsin $(1/n_1)$ and 55°.

If the layer thickness of the holographic-optical output coupling substrate 10 is more than 5 μm or if the layer thickness of the holographic-optical output coupling substrate 10 is more than 3 μm and the angle α is more than 65°, then three individual holographic-optical elements, respectively for one of the three primary colours red, green and blue, are required. These may be written into three individual layers of the respective layer thickness, or all three may be produced in a single layer.

The necessary refractive index modulation Δn, as indicated by way of example in the simulations in FIGS. 15 to 19, are in this case determined by the diffraction efficiency DE and therefore vary. In this case, diffraction efficiency=layer thickness times refractive index modulation. Since the diffraction efficiency of the holographic-optical output coupling substrate 10 changes as described, the refractive index modulation may preferably be adapted to the highest value of the diffraction efficiency required. When three individual volume-holographic elements are exposed in a layer, then the possible refractive index modulation is divided as a sum between these three elements.

It is particularly preferred to produce the holographic-optical output coupling substrate 10 by means of monochromatic exposure with a layer thickness of between 2 μm and 3 μm, and to use an angle of incidence α of at least 45° and less than 65°.

It is likewise possible to use only blue-emitting laser light sources for the illumination system 2 according to the invention. In the colour filter 30, colour conversion is in this case carried out for the red and green image points using Q-dots (quantum dots, semiconductor particles whose size allows light conversion from shortwave to longer-wave light with high frequency selectivity) correspondingly converting to red or green. The advantage of this embodiment is the high light efficiency, since the colour filter absorbs no light, but only converts it, or for blue light has no influence. Furthermore, the configuration of the illumination apparatus 4 may be constructed more simply using an output coupling substrate 10 optimized exclusively monochromatically (for blue). It is self-evident that, in this case, the layer thickness of the output coupling substrate 10 requires no limitation since the frequency bandwidth required only needs to be very narrow.

As an alternative, instead of in the colour filter 30, Q-dots may also be used with a mixture of Q-dots converting to red and green in the interlayer 24 and/or 26 and/or in the diffuser substrate 14 and/or in the transparent substrate 19 and/or in the diffusely scattering layer 20. For this case, a conventional colour filter 30 is again required. The advantage of such an embodiment is that Q-dots do not need to be introduced into the colour filter 30 with pixel accuracy, and that the illumination apparatus 4 furthermore only needs to be optimized monochromatically.

An illumination system according to the invention, with directional laser light, may particularly be used in a liquid-crystal display. In particular, such an illumination system may be employed for use in electronic displays having a particularly advantageous colour space in a compact thin design. If the conventional rear display housing is obviated, and a rear mirroring layer 18 is not used, these illumination systems are also suitable in particular for transparent displays which have versatile applications. Examples of applications are point-of-sale displays, advertising applications in window displays, in transparent information panels in airports, railway stations and other public places, in automobile applications in the roof liner and as information displays in and on the dashboard and the front window, in window glass panes, in commercial refrigerators with transparent doors, optionally also configured as a curved display.

Furthermore, these illumination systems are suitable for use in mobile telephones, smartphones and tablet PCs, in order to produce corresponding devices as particularly compact units.

The invention claimed is:

1. An illumination apparatus for illuminating at least one light modulator device of a liquid-crystal display, comprising:
    at least one light guide substrate for guiding at least one directional light beam which can be coupled into the light guide substrate, wherein the layer thickness of the light guide substrate lies between 30 μm and 10 mm, optionally between 100 μm and 2 mm, and optionally between 300 μm and 1 mm,
    the light guide substrate being at least in optical contact with at least one holographic-optical output coupling substrate comprising a multiplicity of output coupling regions, wherein the holographic-optical output coupling substrate is a reflection or transmission volume hologram, optionally the holographic-optical output coupling substrate is a reflection or transmission volume hologram being recorded using the edge-lit geometry, wherein the holographic-optical output coupling substrate comprises a multiplicity of individual hologram modules, an individual hologram module being adapted in order to diffract a particular primary color,
    an output coupling region being at least adapted in order to couple out a part of the directional light beam in the form of a multiplicity of subbeams in the direction of the light modulator device,
wherein
    at least one diffuser module is provided,
    the diffuser module being adapted in such a way that at least the outermost subbeams of two neighbouring output coupling regions at least adjoin one another before exit from the diffuser module.

2. The illumination apparatus as claimed in claim 1, wherein
    the diffuser module is a separate diffuser substrate arranged between the light guide substrate and the light modulator to be illuminated,
    and/or
    the diffuser module is integrated in the holographic-optical output coupling substrate.

3. The illumination apparatus as claimed in claim 2, wherein the separate diffuser substrate comprises at least one transparent layer and one diffusely scattering layer.

4. The illumination apparatus as claimed in claim 3, wherein
    an interlayer is arranged between the separate diffuser substrate and the light guide substrate, the refractive index of the interlayer being at least less than the refractive index of the light guide substrate, or
    an interlayer is arranged between the separate diffuser substrate and the holographic-optical output coupling substrate, the refractive index of the interlayer being at least less than the refractive index of the holographic-optical output coupling substrate.

5. The illumination apparatus as claimed in claim 1, wherein the holographic-optical output coupling substrate has an angle-widening function.

6. The illumination apparatus as claimed in claim 1, wherein the holographic-optical output coupling substrate is formed from holographic silver halide emulsions, dichromatic gelatins, photorefractive materials, photochromic materials or photopolymers, optionally from photopolymers containing a photoinitiator system and polymerizable writing monomers, optionally photopolymers containing a photoinitiator system, polymerizable writing monomers and crosslinked matrix polymers, optionally from photopolymers containing a photoinitiator system, a polymerizable writing monomer, a crosslinked matrix and a urethane, which is substituted with at least one fluorine atom.

7. The illumination apparatus as claimed in claim 1, wherein the at least one directional light beam has a beam width, and wherein the layer thickness of the light guide substrate is formed in such a way that the layer thickness of the light guide substrate essentially corresponds to the beam width of the at least one directional light beam coupled into the light guide substrate.

8. The illumination apparatus as claimed in claim 1, wherein the holographic-optical output coupling substrate has an angular divergence of between 1° and 120°, optionally between 5° and 60°, and optionally between 10° and 45°.

9. An illumination system, comprising:
    at least one illumination apparatus according to claim 1, and
    at least one light generation device for coupling at least one directional light beam into the light guide substrate of the illumination apparatus.

10. The illumination system as claimed in claim 9, wherein the light generation device is arranged in such a way that the directional light beam makes an input angle with respect to the surface normal of the light guide substrate between the total reflection angle arcsin $(1/n_1)$ and 85°, optionally 75°, optionally 65° and optionally 55°, where $n_1$ is the refractive index of the light guide substrate.

11. The illumination system as claimed in claim 9, wherein the light generation device is adapted in such a way that a geometrical beam width of the directional light beam lies between 0.05 mm and 1 cm, optionally between 0.1 mm and 4 mm, and optionally between 0.3 mm and 2 mm.

12. The illumination system as claimed in claim 9, wherein
    the holographic-optical output coupling substrate is written monochromatically when the layer thickness of the holographic-optical output coupling substrate is at least less than 1 μm or when the layer thickness of the holographic-optical output coupling substrate is at least less than 3 μm and the input angle between the directional light beam and a surface normal lies between the total reflection angle arcsin $(1/n_1)$ and 65°, optionally between the total reflection angle arcsin $(1/n_1)$ and 55°, or the holographic-optical output coupling substrate is written with at least three lasers, optionally red, green and blue lasers, when the layer thickness of the holographic-optical output coupling substrate is at least more than 5 μm or the layer thickness of the holographic-optical output coupling substrate is at least more than 3 μm and the input angle between the directional light beam and the surface normal lies between the total reflection angle arcsin $(1/n_1)$ and more than 65°.

13. The illumination system as claimed in claim 9, at least one further light guide substrate is arranged on at least one edge of the light guide substrate, the further light guide substrate being in optical contact with at least one further holographic-optical output coupling substrate comprising a multiplicity of output coupling regions, at least one light generation device is provided for coupling at least one directional light beam into the further light guide substrate, and an output coupling region being adapted in order to couple out a part of the directional light beam in the form of at least one directional subbeam in the direction of the edge of the light guide substrate.

14. The illumination system as claimed in one of preceding claim 9, wherein the light generation device is adapted in order to emit light essentially monochromatically in the range of from 420 to 485 nm, optionally in the range of from 430 to 480 nm, and optionally in the range of from 440 to 465 nm, the illumination apparatus deviating the emitted light to a light modulator device, and the light modulator device comprises a layer having converting quantum dots, the quantum dots optionally being quantum dots converting from blue to green and/or from blue to red.

15. A liquid-crystal display comprising an illumination system as claimed in claim 14.

* * * * *